United States Patent
Verma et al.

(10) Patent No.: US 7,558,418 B2
(45) Date of Patent: Jul. 7, 2009

(54) REAL TIME IMAGE QUALITY ANALYSIS AND VERIFICATION

(75) Inventors: Amar K Verma, Alpharetta, GA (US); Ranjee B Gangadhar, Alpharetta, GA (US)

(73) Assignee: Goldleaf Enterprise Payments, Inc., Norcross, GA (US)

(*) Notice: Subject to any disclaimer, the term of this patent is extended or adjusted under 35 U.S.C. 154(b) by 646 days.

(21) Appl. No.: 11/210,004

(22) Filed: Aug. 23, 2005

(65) Prior Publication Data

US 2007/0053574 A1    Mar. 8, 2007

(51) Int. Cl.
*G06K 9/00* (2006.01)
*G06Q 40/00* (2006.01)

(52) U.S. Cl. .................. 382/137; 235/379

(58) Field of Classification Search ........... 382/135, 382/136, 137, 138, 139, 305; 194/203, 205, 194/206, 207, 208; 235/379, 419, 437, 476; 707/10; 705/64, 75, 24, 39; 715/255, 223, 715/235, 732; 902/40

See application file for complete search history.

(56) References Cited

U.S. PATENT DOCUMENTS

| | | | |
|---|---|---|---|
| 5,668,897 A | | 9/1997 | Stolfo |
| 5,754,674 A | * | 5/1998 | Ott et al. .............. 382/112 |
| 5,917,965 A | | 6/1999 | Cahill et al. |
| 6,097,834 A | * | 8/2000 | Krouse et al. .......... 382/137 |
| 6,181,837 B1 | * | 1/2001 | Cahill et al. .......... 382/305 |
| 6,931,589 B2 | | 8/2005 | Baltsan et al. |
| 7,269,279 B2 | * | 9/2007 | Chiles ................... 382/135 |
| 2002/0145035 A1 | | 10/2002 | Jones |
| 2003/0120593 A1 | * | 6/2003 | Bansal et al. .......... 705/39 |
| 2005/0071283 A1 | | 3/2005 | Randle et al. |

FOREIGN PATENT DOCUMENTS

WO    WO 03/046785    6/2003

* cited by examiner

*Primary Examiner*—Abolfazl Tabatabai
(74) *Attorney, Agent, or Firm*—Harness, Dickey & Pierce, P.L.C.

(57) ABSTRACT

A configurable image quality analysis system for use at a point of presentment includes an input receptive of an item image of a physical item at least partially embodying a financial transaction. An image quality module is adapted to perform a plurality of image quality tests on the item image according to a plurality of configurable test parameters. An edit module is adapted to perform at least one edit on images of unacceptable quality as defined by the image quality module according to a plurality of configurable edit parameters. An output is adapted to report results of the tests of the image quality module and an edited image from the edit module.

27 Claims, 3 Drawing Sheets

REAL TIME IMAGE QUALITY ANALYSIS AND VERIFICATION

FIELD OF THE INVENTION

The present invention generally relates to financial transaction systems, methods, and devices, and particularly to systems and methods of transactions at point of presentment utilizing image quality analysis and verification.

BACKGROUND OF THE INVENTION

Financial institutions typically interact with parties to transactions, such as individuals, partnerships, companies, and corporations, by providing points of presentment at locations that are, convenient to the parties to the transactions. Points of presentment include, for example, front counters of bank branches, cash vaults, merchant back offices, and automated teller machines (ATMs) providing deposit automation. Parties to transactions present physical items embodying a transaction at these points of presentment, and these items typically include checks, cash, withdrawal slips, deposit slips, loan payment slips, and/or remittance slips. Images of these items are taken at the point of presentment to assist in the processing of the transaction.

While tellers often assist parties to transactions at some points of presentment, these tellers are typically required to spend excessive amounts of time and attention to data entry and transaction balancing. Furthermore, the tellers typically have no way of ensuring that all items of a transaction are valid. In addition, points of presentment affording no teller assistance rely entirely on the party to the transaction to ensure that the transaction is balanced. Thus, the teller's focus is on the transaction and not the customer.

Often financial institution branches will initiate a transaction at the point of presentment, then re-initiate assembly and processing of the transaction and images of the transaction, long after the party to the transaction has departed the point of presentment. As a result, unbalanced and/or invalid transactions, and image mismatches are discovered late, without affording the party to the transaction or the teller at the point of presentment an opportunity to correct or otherwise balance the transaction.

For financial institutions to be capable of truncating items at the point of presentment, and to comply with newly published standards for the exchange of image based transactions, (ANSI DSTU X9.37 2003), it is necessary to perform a plurality of quality, usability and integrity tests upon the item images. Given that truncation standards may allow for destruction of the paper item at the point of presentment, item images must be qualified at the point of presentment during capture of the transactions.

The need remains, therefore, for a system and method of processing a transaction at a point of presentment that improves quality control of transactions and images, in a real time mode, while reducing time and labor requirements at a point of presentment. The present invention fulfills this need.

SUMMARY OF THE INVENTION

In accordance with the present invention, a configurable image quality analysis system for use at a point of presentment includes an input receptive of an image of a physical item which at least partially embodies a financial transaction. An image quality module is adapted to perform a plurality of quality tests on the image according to a plurality of configurable test parameters, inclusive of validating the image against the item information associated with it. An edit module is adapted to perform at least one edit on images of unacceptable quality as defined by the image quality module according to a plurality of configurable edit parameters. An output is adapted to report results of the tests of the image quality module and an edited image from the edit module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
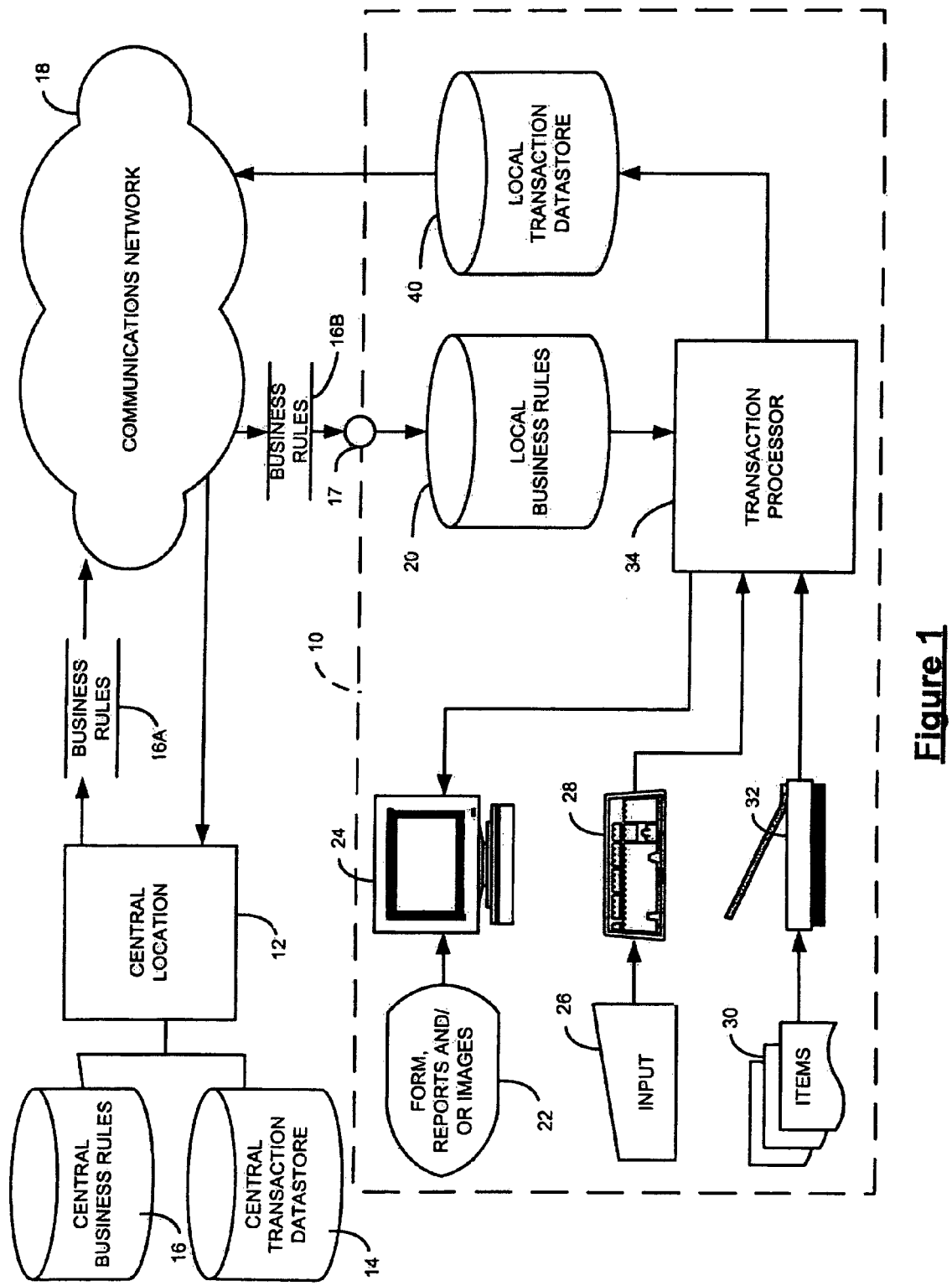
FIG. 1 is a entity relationship diagram illustrating a financial transaction system implemented at a point of presentment according to the present invention.

The following description of the preferred embodiment is merely exemplary in nature and is in no way intended to limit the invention, its application, or uses. For purposes of clarity, the same reference numbers will be used in the drawings to identify similar elements.

FIG. 1 illustrates a point of presentment 10 implementing a financial transaction processing system including a real time image quality analysis system in accordance with the present invention. It is envisioned that a financial institution according to the present invention has a central location 12 with a central transaction datastore 14 and centralized business rules 16. The central location 12 promulgates central business rules 16 by daily transmitting business rules data 16A over a communications network 18, such as the Internet, to plural points of presentment. In turn, point of presentment 10 daily receives rules data 16B via data input 17 and stores it in local business rules datastore 20.

Local business rules datastore 20 may store validation characteristics for authenticating identity of parties and/or items. Validation characteristics may include routing numbers for financial institutions, account numbers for parties to transactions, one or more signatures or other biometric characteristics of individuals, and/or encryption keys, hash functions, and similar code features relating to digital, watermarks, holograms, and other item features. As further explained below, local business rules datastore 20 also define how to identify a type of document item based on image features and/or codeline data, how to extract, recognize, and utilize features from different types of documents, and how to validate and balance different types of transactions.

Transaction processor 34 inputs transaction data including images of items 30 that are scanned using imaging and scanning mechanism 32 and user input 26 provided by an input device 28. Input device 28 may be at least one of a keyboard, a mouse, a touchscreen, a microphone with speech recognition capability, and/or other input mechanisms. Transaction processor 34 generally performs the tasks of recognizing, validating and balancing the transaction. More specifically, transaction processor 34 performs the tasks of assigning a unique document identification number (DIN) to each item image, recognizing and extracting relevant data from item images, and filling fields of electronic form 22 with extracted data. As, shown in FIG. 2, transaction processor 34 further includes a configurable image quality analysis system 50 used to determine the validity and quality of each item image according to validation characteristics of local business rules 20. Corrections to item images and field contents may be made by a user interfacing with the application at the point of presentment or a user facilitating the transaction at a remote location using an input device 28 and/or scanning mechanism 32. Transaction processor 34 balances the complete cash and/or check transaction and sends a validation decision along with the electronic from filling results back to the user via visual screen 24. Transaction processor 34 posts data stored in local transaction datastore 40 which is then available for communication to central transaction datastore 14 upon receipt of input 26 command to post.

Figure 2:
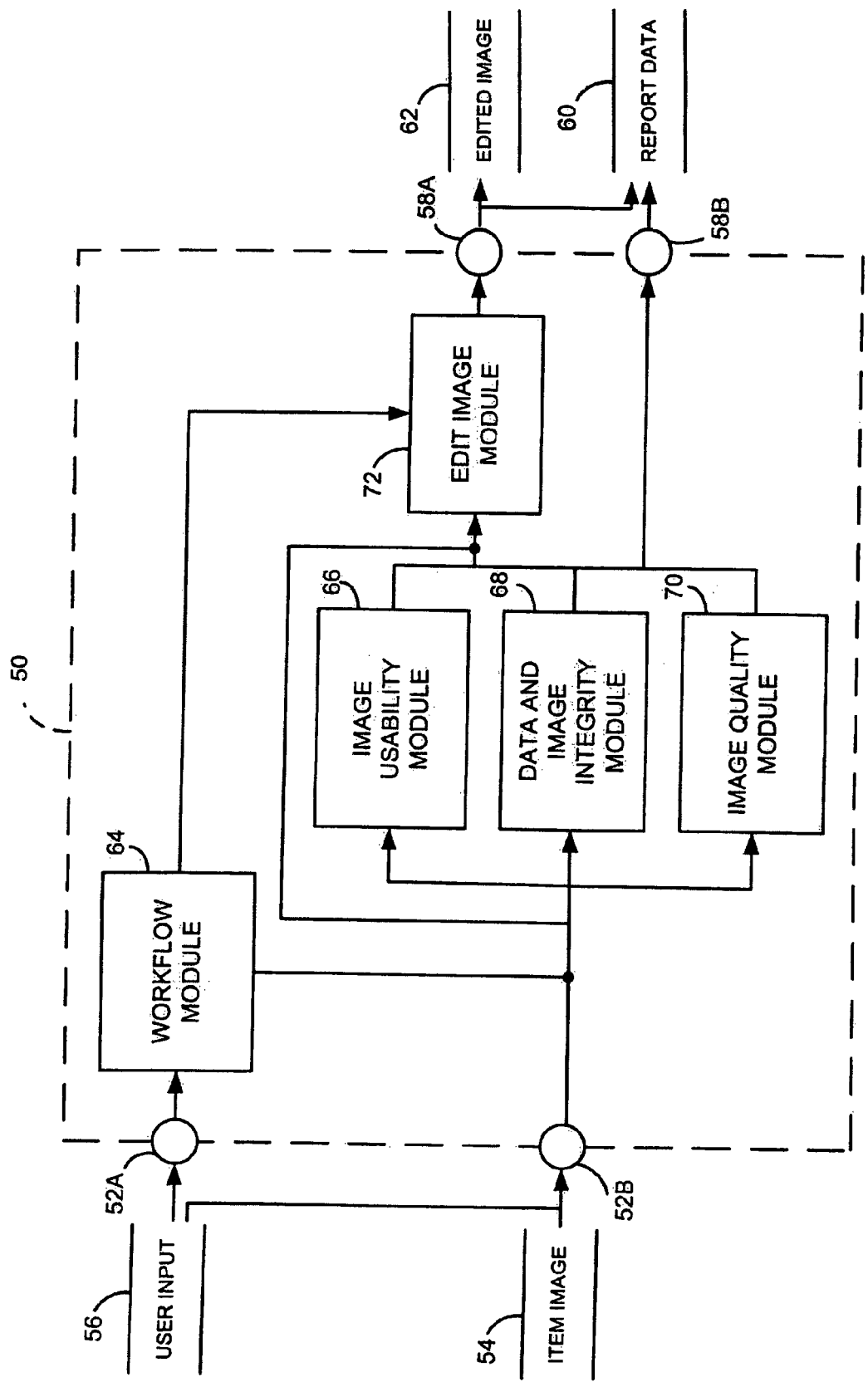
FIG. 2 is a functional block diagram illustrating an image quality analysis, transaction processing system for use at a point of presentment according to the present invention.

FIG. 2 illustrates the function of configurable image quality analysis system 50 of transaction processor 34 in accordance with the present invention. As can be appreciated, image quality analysis system 50 can be configured to validate item images other than item images of a financial transaction. An input 52 is receptive of item image 54 and user input 56. User input 56 is adapted to configure the system to perform quality tests on item image 54 according to local business rules 20 which may include institution specific requirements, as well as federally-mandated requirements for item truncation. An output 58 is adapted to provide quality report data 60 and edited images 62 that are viewable by the user and that may be stored in local transaction datastore 40. Workflow module 64 configures and dictates how and when image quality analysis is performed via user input 56. Workflow module 64 can be adapted to validate a single image, a group of images, or a specific subset of images according to configurable tests and parameters. Workflow module 64 can also be adapted to schedule the performance of image quality analysis tests for a sender before transmittal to central location 12 or by a receiver after transmittal to central location 12. Workflow module 64 can also be adapted to configure how images are displayed and modified during review mode processing. Parameters such as zoom percentage, rotation of item image, display mode (i.e. single view, duplex view, or multiple view), display interval in seconds, display header, display unchecked, accepted, suspected, rejected or all images, and delete specific images can be configured via user input 56.

Image usability module 66 configures and extracts usability test fields from item image 54 via user input 56. Usability test fields may be defined as test areas on a check document such as date, payee, courtesy amount, legal amount, signature, payor name and address, magnetic ink character recognition (MICR) line, memo line, payer bank and address, payee endorsement, institution of first deposit endorsement and/or transit endorsement. For example certain field data may not be available if the item is not properly scanned, e.g. upside down or backwards. Image usability module 66 tests to determine whether the selected usability test field is present and, reports an acceptance state of true or false based upon its existences.

Data and image, integrity module 68 establishes the validity of data extracted from item image 54 to assure they are for the same item. Data and image integrity module 68 validates visual data on item image 54 against validation characteristics stored in datastore and determines a validation state based thereon. For example, visible MICR codeline can be validated against stored MICR codeline data. The validation tests can be configured via user input 56. For example, a user might enter user input according to how many digits of codeline data must match to return a positive or negative match. Data and image integrity module reports validity decisions to the user via data output 58.

Image quality module 70 employs image analysis techniques to determine a quality image. Image quality module 70 inputs user input 56 and item image 54. User input 56 is adapted to configure parameters of any number of quality tests. Quality tests are performed on item image 54. Quality tests include, but are not limited to, partial image test, excessive skew test, piggyback item test, too light or too dark test, streaks or bands test, exceed minimum size test, and exceed maximum size test. Partial image test detects and reports if only part of an expected item image 54 is present. Excessive skew detects and reports item image 54 exceeds allowable skew parameters. Piggyback item test detects the presence of more than one item image for an image 54. Too light or too dark tests detect images outside of the allowable parameters for lightness of darkness of item image 54. Streaks or bands test detects foreign image content preventing recognition of the item image information. Exceeds size test validates that the storage size of the item image 54 is within the minimum and maximum allowable parameters. A data output is adapted to report results of each test performed. Tests and test parameters may be established by promulgated central business rules 16 and/or local business rules 20.

Edit image module 72 performs detection and editing based on reported flaws from image usability module 66 data and image integrity module 68, image quality module 70, and user input 56. Edit module 72 functions include, but are not limited to, deskewing, filtering (removing speckles and hole punches), cropping, rotating, annotating, framing, scaling, and image format conversion. Each edit function has associated configurable parameters that define the edit to be performed on item image 54. Edit image module 72 outputs an edited image 62 and report data 60 according to parameters configured in workflow module 64.

Figure 3:
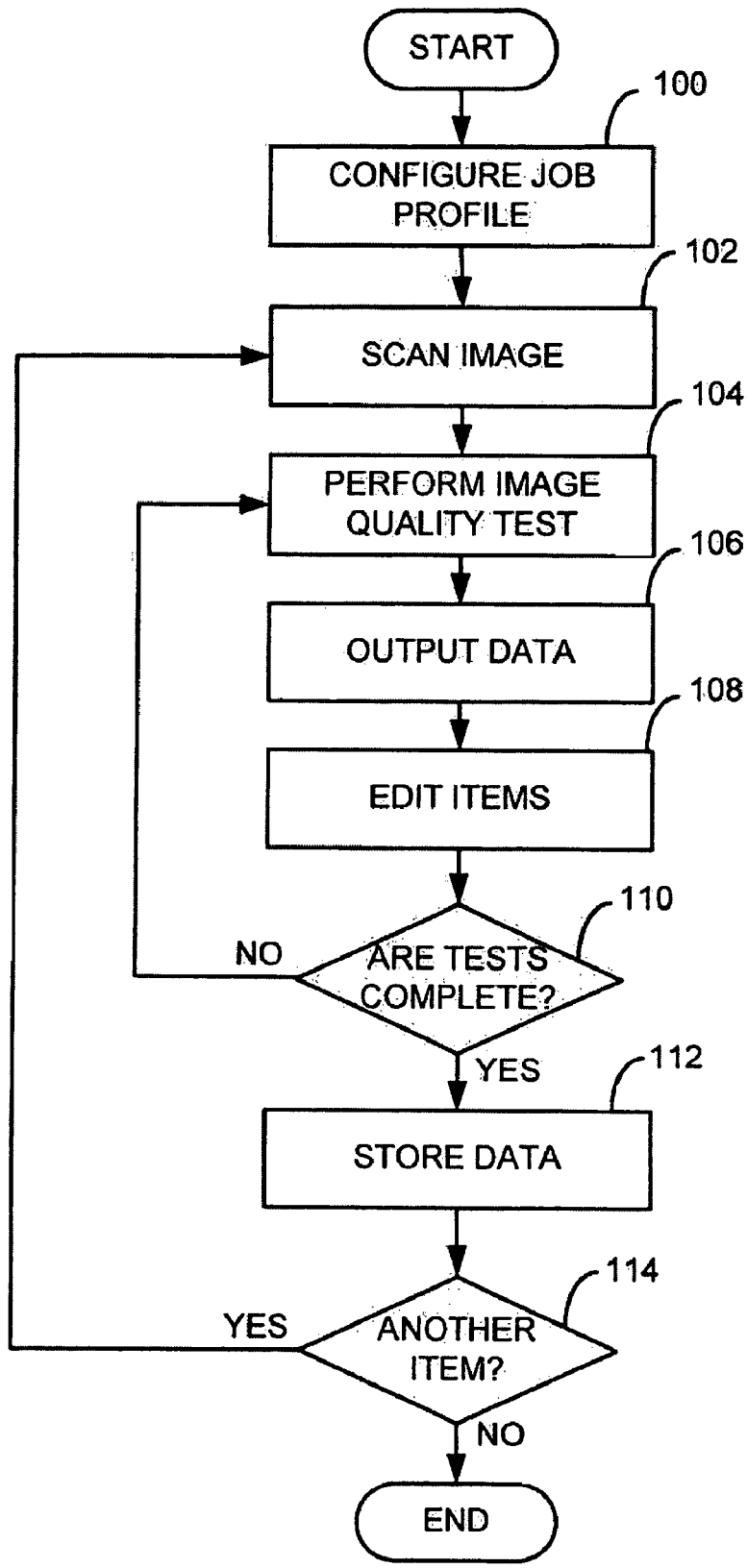
FIG. 3 is a flow diagram illustrating an image quality analysis method according to the present invention.

The preferred embodiment of the system of the present invention having now been described in detail, attention is now directed to the method according to the present invention as illustrated in FIG. 3. FIG. 3 illustrates a method of performing image quality analysis on an item. Accordingly, at step 100, a job profile is configured. The user configures parameters associated with the workflow, image usability, data and image integrity, image quality, and edit functions. The parameters are saved as a job profile. Image quality analysis is then scheduled to occur according to the workflow specified in the job profile. At step 102, an image is created using scanning mechanism 32. A single item or a batch of items may be processed according to the job profile. At step 104, image quality tests configured in the job profile to run are performed. A single test may be performed or a number of tests may be performed simultaneously before output is displayed to the screen. At step 106, item image 54 is output from the image quality module 70 and is available for post-test editing, if necessary. At step 108, inferior quality item images can be edited to provide a satisfactory quality image via pre-configured edit commands or commands entered by the user. If all scheduled quality tests are complete, at step 110, the validated image and extracted image data are stored in local transaction datastore 40 at step 112. At step 114, the process continues until each item of the batch has been tested.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A configurable image quality analysis system for use at a point of presentment, comprising:
   at least one processor having;
   an input at the point of presentment receptive of an image of a physical item at least partially embodying a financial transaction;
   an image quality module adapted to perform a plurality of image quality tests in real time on the image according to a plurality of configurable test parameters to identify a poor quality image;
   an edit module adapted to perform at least one edit in real time on the poor quality image to generate an edited image; and
   an output adapted to report in real time at least one of the edited image and a report of results from the plurality of quality tests of the image quality module.

2. The system of claim 1, wherein the edited image is stored in a transaction datastore.

3. The system of claim 1, wherein the report is stored in a transaction datastore.

4. The system of claim 1, further comprising a workflow module adapted to sequence the plurality of image quality tests.

5. The system of claim 4, wherein the workflow module is further adapted to configure an image display parameter.

6. The system of claim 1, further comprising an image usability module adapted to configure and extract a test field from the image, and wherein the usability test fields are used to determine an acceptance state based upon the presence of the test field on the image.

7. The system of claim 6, further comprising a data and image integrity module adapted to determine a validation state based upon a comparison of visual data extracted from the image with a validation characteristic.

8. The system of claim 7, wherein the data and image integrity module is further adapted to retrieve the validation characteristics from a datastore.

9. The system of claim 1, wherein the image quality module performs at least one image test function selected from the group consisting of a partial image test, excessive skew test, piggyback image test, too light test, too dark test, streaks test, bands test, exceeds minimum size test and maximum size test.

10. The system of claim 1, wherein the edit module performs at least one image edit function selected from the group consisting of border detection, filtering, cropping, rotation, annotation, framing, scaling, and image conversion.

11. The method of claim 10, further comprising determining validation state based on a comparison of visual data extracted from the item image with a validation characteristic.

12. The method of claim 11 wherein the validation characteristic is retrieved from a datastore.

13. The system of claim 1, wherein the physical item is received from a first user, the at least one edit is performed based on input from a second user, and the second user receives the output.

14. The system of claim 13, wherein the first user is located at the point of presentment and the second user is remote from the point of presentment.

15. The system of claim 1, wherein the physical item is received from a first user, the at least one edit is performed based on input from the first user, and the first user receives the output.

16. A method comprising:
   at least one processor performing the following:
   retrieving a job profile from a datastore, wherein the job profile includes a set of document identifiers and a set of image quality test parameters;
   generating an image record in real time of a physical item at least partially embodying a financial transaction, the physical item being received at a point of presentment;
   performing an image quality test on the image record in real time based on the set of image quality test parameters to determine an image quality state;
   selectively editing the image record in real time based on the image quality state to create a corrected image record;
   posting at least one of the image quality test results and the corrected image record to a screen for viewing in real time; and
   selectively extracting data from the corrected image record according to the set of document identifiers in real time.

17. The method of claim 16, further comprising configuring a workflow parameter to sequence execution of the at least one imagine quality test.

18. The method of claim 17, further comprising configuring work flow parameters to display the image quality test results and the corrected image record.

19. The method of claim 16, further comprising posting the image quality test results and the corrected image record to a transaction datastore.

20. The method of claim 16, further comprising determining an acceptance state based the presence of a usability test field in the image record.

21. The method of claim 20 wherein the acceptance state is retrieved from a datastore.

22. The method of claim 16, wherein performing at least one image quality test includes at least one test selected from the group consisting of partial image test, excessive skew test, piggyback image test, too light test, too dark test, streaks test, bands test, exceeds minimum size test and maximum size test.

23. The method of claim 16, editing the flared image includes at least one editing function selected from the group consisting of deskewing, adding annotation, framing, scaling, and converting the flawed image.

24. The method of claim 16, wherein the physical item is truncated from the financial transaction based on the image quality state.

25. The method of claim 16, wherein the physical item is received from a first user, the image record is edited based on input from a second user, and the screen is viewed by the second user.

26. The method of claim 25, wherein the first user is located at the point of presentment and the second user is remote from the point of presentment.

27. The method of claim 16, wherein the physical item is received from a first user, the image record is edited based on input from the first user, and the screen is viewed by the first user.

* * * * *

UNITED STATES PATENT AND TRADEMARK OFFICE
CERTIFICATE OF CORRECTION

PATENT NO.        : 7,558,418 B2                                          Page 1 of 1
APPLICATION NO.   : 11/210004
DATED             : July 7, 2009
INVENTOR(S)       : Amar K. Verma and Ranjee B. Gangadhar It is certified that error appears in the above-identified patent and that said Letters Patent is hereby corrected as shown below:

Column 6, Line 37, Claim 20, after "based," insert --on--.

Column 5, Line 55, Claim 11, replace "claim 10" with --claim 16--.

Signed and Sealed this

Twenty-second Day of September, 2009

David J. Kappos
*Director of the United States Patent and Trademark Office*